US012440806B2

United States Patent
Ray et al.

(10) Patent No.: US 12,440,806 B2
(45) Date of Patent: Oct. 14, 2025

(54) PROCESS FOR ELIMINATING HYDROGEN SULFIDE IN AN AMMONIUM SULFATE SOLUTION

(71) Applicant: ThioSolv, LLC, Largo, FL (US)

(72) Inventors: Michael J. Ray, Clearwater, FL (US); Michael F. Ray, Clearwater, FL (US); Matthew F. Ray, Clearwater, FL (US)

(73) Assignee: THIOSOLV, LLC, Largo, FL (US)

( * ) Notice: Subject to any disclaimer, the term of this patent is extended or adjusted under 35 U.S.C. 154(b) by 664 days.

(21) Appl. No.: 17/959,035

(22) Filed: Oct. 3, 2022

(65) Prior Publication Data
US 2024/0042381 A1 Feb. 8, 2024

Related U.S. Application Data

(60) Provisional application No. 63/370,461, filed on Aug. 4, 2022.

(51) Int. Cl.
| | | |
|---|---|---|
| *B01D 53/52* | (2006.01) | |
| *B01D 53/58* | (2006.01) | |
| *B01D 53/78* | (2006.01) | |
| *C01B 17/16* | (2006.01) | |
| *C02F 1/66* | (2023.01) | |
| *C02F 1/68* | (2023.01) | |

(52) U.S. Cl.
CPC ........ *B01D 53/52* (2013.01); *B01D 2257/304* (2013.01)

(58) Field of Classification Search
None
See application file for complete search history.

(56) References Cited

FOREIGN PATENT DOCUMENTS

| WO | 2021003479 A1 | 1/2021 | |
|---|---|---|---|
| WO | WO-2024030761 A1 * | 2/2024 | ............ B01D 53/52 |

OTHER PUBLICATIONS

US Department of Agriculture, "Anaerobic Digestate," 2017.
Ontario Ministry of Agriculture, Food, and Rural Affairs, "Hydrogen Sulphide in Agricultural Biogas Systems," 2011.
Washington State Department of Ecology, "Department of Ecology Report to the Legislature—Dairy Manure Anaerobic Digesters," 2012.
D. Erdirencelebi and M. Kucukhemek, "Control of hydrogen sulphide in full-scale anaerobic digesters using iron (III) chloride: performance, origin and effects," Water SA, vol. 44, No. 2, p. 176, 2018.

* cited by examiner

*Primary Examiner* — Daniel Berns
(74) *Attorney, Agent, or Firm* — D'Ambrosio & Menon, PLLC; Usha Menon

(57) ABSTRACT

A process for substantially removing hydrogen sulfide from an ammonium sulfate solution. The process involves maintaining the pH of the solution to a range that optimally removes entrained hydrogen sulfide. The hydrogen sulfide is then reacted with sulfites, bisulfites, or sulfur dioxide to form ammonium thiosulfate.

13 Claims, 2 Drawing Sheets

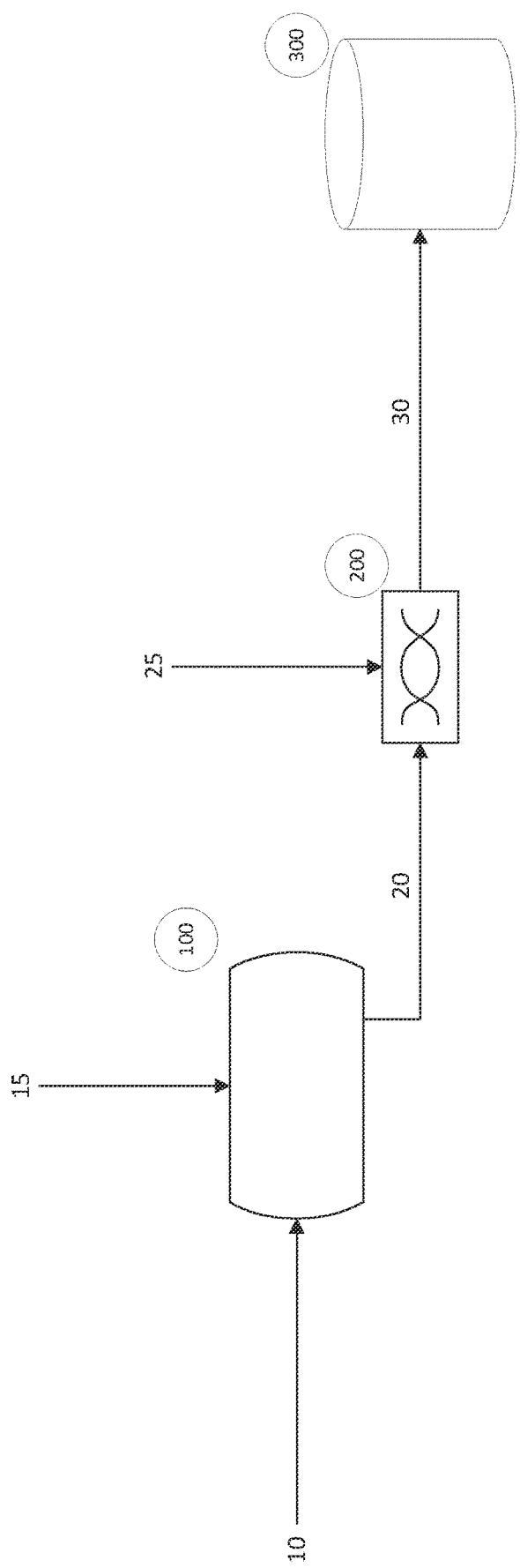

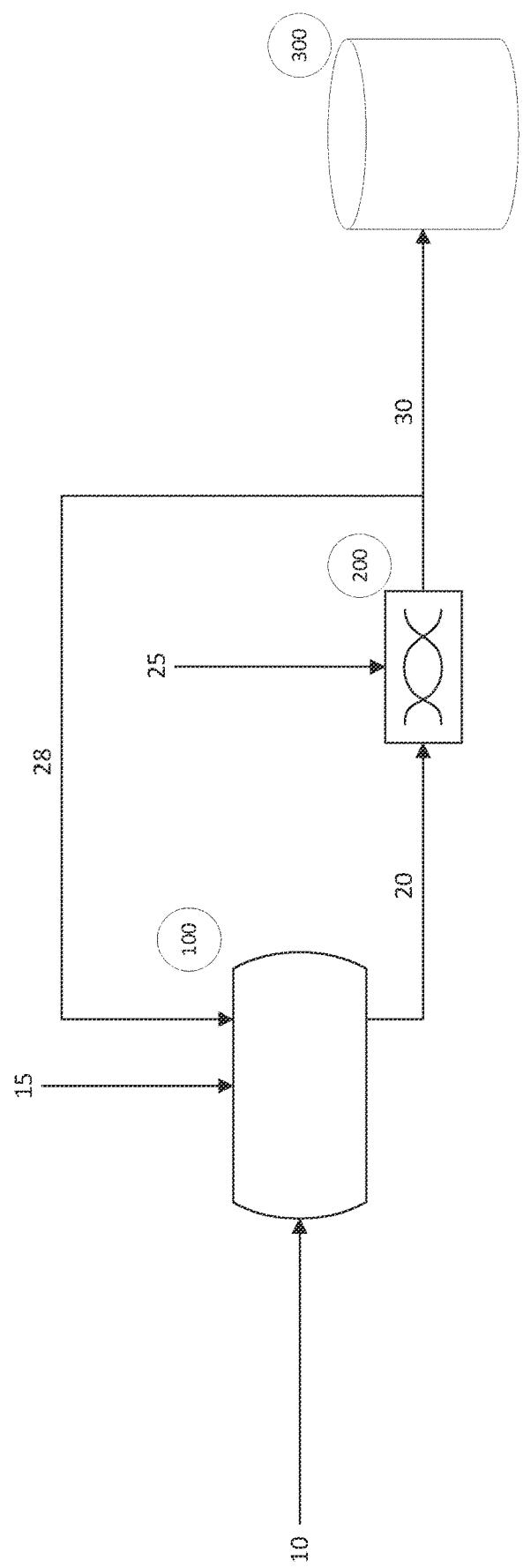

PROCESS FOR ELIMINATING HYDROGEN SULFIDE IN AN AMMONIUM SULFATE SOLUTION

CROSS-REFERENCE TO RELATED APPLICATION

This application claims priority from U.S. Provisional Patent Application No. 63/370,461 filed on Aug. 4, 2022, the entire disclosure of which is part of the disclosure of the present application and is hereby incorporated by reference in its entirety.

TECHNICAL FIELD

The present invention relates to a process for eliminating hydrogen sulfide in a liquid stream.

BACKGROUND

Liquid ammonium sulfate is a common fertilizer that is produced as a side product during various processes. These processes may include, but are not limited to, the extraction of gaseous ammonia from liquids derived from anaerobic digesters. Anaerobic digesters are commonly found at municipal and industrial wastewater treatment plants and farms, such as concentrated animal feed operations, where biogas is converted to energy to supplement income. Anaerobic digestates contain volatile hydrogen sulfide. The hydrogen sulfide gas is produced during the anaerobic metabolism of sulfur containing amino acids by microorganisms in the digesters. Similarly, untreated digestate continues to be metabolized over long periods of time to further increase entrained hydrogen sulfide. Consequently, liquid ammonium sulfate extracted from the anaerobic digestate may include a substantial amount of entrained hydrogen sulfide. Dissolved hydrogen sulfide can exist in three anionic species that are dependent on the pH of the aqueous solution. Importantly, the proportion of $H_2S$ to $HS^-$ can change rapidly at a pH value of 7.8. The volatility, and potential danger of hydrogen sulfide, is greatest when an anerobic digestate extraction changes from a neutral or basic pH to a lower value. Anaerobic digestates and extracts thereof are typically adjusted to be more alkaline and further from this crucial point in the equilibrium.

If an ammonium sulfate solution that contains entrained hydrogen sulfide is used as a fertilizer, the hydrogen sulfide may be released. This release may happen when the ammonium sulfate solution is applied to the soil, when it is blended with other components before application to the soil, when it contacts low pH materials in the soil, or when it is mixed with more acidic ammonium sulfate solutions (such as, ammonium sulfate containing excess sulfuric acid). Hydrogen sulfide is a highly toxic and corrosive gas that can be lethal to humans even at relatively low limits. The uncontrolled release of hydrogen sulfide may cause serious harm to farmers, agricultural workers, or other individuals in the vicinity. Therefore, there is a need to substantially eliminate hydrogen sulfide from an ammonium sulfate solution. In particular, it is important to eliminate hydrogen sulfide from an ammonium sulfate solution before it is sold as fertilizer to avoid the release of hydrogen sulfide during the storage, blending, sale and mixing of the fertilizer.

Existing methods employed to remove entrained hydrogen sulfide include aeration and the addition of iron salts. Aqueous solutions can be aerated or mixed with air or oxygen gas to both remove hydrogen sulfide from the headspace of a storage tank and to oxidize it to the sulfate anion. However, aeration does not solve the issue of continued hydrogen sulfide release during long term storage or when the solution encounters another acid source. Iron chloride has been used with moderate success for the removal of hydrogen sulfide in anaerobic digesters at wastewater treatment plants. Iron salts can reduce hydrogen sulfide and the corresponding anions to elemental sulfur and iron sulfide. Advantageously, the reduced products become insoluble precipitates and lower the risk of hydrogen sulfide off-gassing in later processes or applications. This is also the major drawback to the method as the precipitates will eventually need to be removed at a later state. Furthermore, the correct stoichiometric amount of iron salt to add is difficult to determine because of iron consumption by competing reactions in the liquid phase and because of the encapsulation of iron salt granules by iron sulfide. Thus, there is an ongoing need for a process to eliminate hydrogen sulfide in an ammonium sulfate solution.

SUMMARY

According to one or more embodiments, a process for eliminating entrained hydrogen sulfide in an aqueous solution to facilitate its application to soil, to be blended with other components before application to the soil, to be in contact with low pH materials in the soil, and to be mixed with more acidic ammonium sulfate solutions.

According to one or more embodiments, a process for selectively eliminating hydrogen sulfide from an aqueous ammonium sulfate stream involves injecting sulfur dioxide or a solution containing sulfite or bisulfite ions to produce an aqueous mixture of ammonium sulfate containing ammonium thiosulfate (ATS).

A treatment solution can be used to selectively react the hydrogen sulfide present in an aqueous ammonium sulfate solution. The treatment solution can include an aqueous sulfite or bisulfite solution with one or more cations. Importantly, the treatment solution is configured such that the pH of the final ammonium sulfate solution is not lowered below a value of 4.5 and is preferably kept in the range of 5.0 to 10.5 and more preferably kept in the range of 5.5 to 8.5. Further, the stoichiometric ratio of sulfite or bisulfite ions to hydrogen sulfide is maintained in excess to facilitate conversion in downstream processes where additional hydrogen sulfide may be entrained. The treatment solution can be advantageously used to react the hydrogen sulfide from any gas stream that may contain ammonia and hydrogen sulfide to produce an ammonium thiosulfate ("ATS") solution. If other cations are used other than ammonia then the corresponding form of the thiosulfate would be produced.

In an embodiment, a gaseous stream of ammonia, water vapor, and hydrogen sulfide can be treated with sulfuric acid to produce ammonium sulfate wherein the hydrogen sulfide is unreacted or exists as ammonium hydrosulfide or diammonium sulfide. In the case that the solution is acidic, liberated hydrogen sulfide gas is immediately dealt with by the process operator. In the case that the final solution is basic and hydrogen sulfide is captured, the solution is chemically treated with a treatment solution containing sulfite or bisulfite solution to convert hydrogen sulfide to thiosulfate.

According to one or more embodiments, the ammonia remains in excess after treatment with sulfuric acid. This substantially reduces the amount of hydrogen sulfide liberated during the reaction so that it may be later converted to the thiosulfate anion.

According to one or more embodiments, the concentration of dissolved ammonium cations is sufficient to react with sulfur dioxide gas in an aqueous solution. A high concentration of ammonium in solution enables sulfur dioxide gas to react with water and form the sulfite anion in situ. Subsequently, the sulfite reacts with captured hydrogen sulfide to form the thiosulfate.

According to one or more embodiments, the ammonia can be from any organic source, such as, an anaerobic digester or other green ammonia source captured with sulfuric acid. Additionally, the sulfite or bisulfite ionic solution is also from an organic source of ammonia. Thus, the ammonium thiosulfate that is produced is also organic.

According to one or more embodiments, the thiosulfate in the solution will inhibit the oxidation of the sulfite ions to sulfate thereby maintaining the sulfite ions in solution to react with any entrained hydrogen sulfide in the liquid and convert it to thiosulfate.

According to one or more embodiments, if the pH of the ammonium thiosulfate solution below a desired value, additional ammonia may be added, prior to the addition of sulfite or bisulfite ions, to eliminate the risk of release of hydrogen sulfide from the solution.

BRIEF DESCRIPTION OF THE DRAWING

The invention will be described in detail below with reference to the attached drawings which describe or relate to an apparatus and methods for the present invention.

FIG. 1 illustrates a schematic diagram of an exemplary system for removing hydrogen sulfide from an ammonium sulfate solution according to an embodiment.

FIG. 2 illustrates a schematic diagram of an exemplary system for removing hydrogen sulfide from an ammonium sulfate solution with an additional recycle stream according to an embodiment.

DETAILED DESCRIPTION OF THE INVENTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details. Depending on the context, all references below to the "invention" may in some cases refer to certain specific embodiments only. In other cases, it will be recognized that references to the "invention" will refer to subject matter recited in one or more, but not necessarily all, of the claims.

When describing a range of pHs, concentrations and the like, it is the Applicant's intent to disclose every individual number that such a range could reasonably encompass, for example, every individual number that has at least one more significant figure than in the disclosed end points of the range. As an example, when referring to a pH as between about 5.5 and 8.0, it is intended to disclose that the pH can be 5.5, 8.0 or any value between these values, including any subranges or combinations of subranges encompassed in this broader range. Applicant's intent is that these two methods of describing the range are interchangeable. Moreover, when a range of values is disclosed or claimed, Applicant also intends for the disclosure of a range to reflect, and be interchangeable with, disclosing any and all sub-ranges and combinations of sub-ranges encompassed therein. Accordingly, Applicant reserves the right to proviso out or exclude any individual members of any such group, including any sub-ranges or combinations of sub-ranges within the group, or any selection, feature, or aspect that can be claimed, if for any reason Applicant chooses to claim less than the full measure of the disclosure, for example, to account for a reference that Applicant may be unaware of at the time of the filing of the application. In particular, the ranges set forth herein include their endpoints unless expressly stated otherwise.

The term "about" means that pH and other parameters and characteristics are not and need not be exact, but may be approximate and/or larger or smaller, as desired, reflecting tolerances, conversion factors, rounding off, measurement error and the like, and other factors known to those of skill in the art. An amount, size, formulation, parameter or other quantity or characteristic is "about" or "approximate" whether or not expressly stated to be such. Whether or not modified by the term "about", the claims include equivalents to the values stated therein.

Furthermore, the particular illustrative embodiments disclosed herein may be altered or modified and all such variations are considered within the scope and spirit of the present invention. While process is described in terms of "comprising," "containing," or "including" various devices/components or steps, it is understood that the process also can "consist essentially of" or "consist of" the various components and steps.

Entrained hydrogen sulfide in ammonium sulfate solutions presents a substantial risk to human health. Common methods utilized to eliminate the entrained hydrogen sulfide include treatment with metal salts, such as iron chloride, and aeration in the presence of oxygen or air. Reduction of hydrogen sulfide with metal salts leads to the formation of insoluble precipitates. While the precipitate effectively removes sulfur from the ammonium sulfate solution, the correct stoichiometric ratio of metal salt to sulfur content is difficult to determine. Metal salts participate in undesirable competing reactions and may not fully dissolve due to encapsulation by metal sulfides. Furthermore, the metal sulfide precipitates require removal in an additional processing step. Aeration in the presence of oxygen or air can displace and dilute hydrogen sulfide gas. At the same time, entrained hydrogen sulfide can be oxidized to the sulfate anion. However, aeration does not prevent the release of hydrogen sulfide at later processing steps. There is a substantial need for a process to remove entrained hydrogen sulfide from an ammonium sulfate solution that is also capable of preventing its release during downstream processing.

As illustrated in FIG. 1, a first process stream 10 containing ammonia, water vapor, and hydrogen sulfide is introduced into Vessel 100. The ammonia can be from an organic ammonia source, such as, an anaerobic digester. The ammonia can also be from any source, such as, but not limited to, a refinery that processes high ammonia crude (where nitrogen crudes can be hydrotreated to create a source of ammonia), a landfill liquid stream, a wastewater treatment facility, or any other green ammonia source. In Injection Vessel 100, the process stream 10 is reacted with sulfuric acid from a second process stream 15. According to an embodiment, 2%-4% excess sulfuric acid is present to substantially extract all the ammonia from process stream 10 as ammonium sulfate creating a low pH solution which would typically liberate most of the hydrogen sulfide in the process. In existing processes, liberated hydrogen sulfide is vented to the atmosphere to prevent the build-up of the dangerous gas. Alternatively, lower ratios of sulfuric acid to ammonia will produce higher pH solutions and have greater ability to draw the hydrogen sulfide into solution.

The resulting ammonium sulfate solution in Injection Vessel 100 preferably has a pH greater than 4.5, and more preferably in the range of 5.5 to 8.5. At the higher pH range, more hydrogen sulfide can be entrained in the liquid phase. The alkaline solution also buffers against a rapid decrease in the pH value, immediately after which hydrogen sulfide would be released. Significant changes in pH may occur upon mixing with other components before application to the soil, when it contacts low pH materials in the soil, or when it is mixed with more acidic ammonium sulfate solutions. According to an embodiment, if the resulting solution has a low pH, additional ammonia can be fed to the Injection Vessel 100 to substantially reduce the risk of hydrogen sulfide gas release. Similarly, in an embodiment, the amount of ammonia to hydrogen sulfide can be maintained above a ratio of 1:1, and preferably at 2:1, so that the solution contains enough (or an excess of) ammonia to react with sulfite or bisulfite ions and hydrogen sulfide. For the purposes of this invention, hydrogen sulfide is optimally entrained in the ammonium sulfate solution and, therefore, embodiments of the process relate to the stoichiometric balance of ammonia to hydrogen sulfide.

The ammonium sulfate solution from Injection Vessel 100 is transported to Injection Mixer 200 via a third process stream 20. Injection Mixer 200 can be any static, in-line mixer driven by a motor. Within the Injection Mixer 200, a treatment solution comprising a sulfite or bisulfite solution with one or more cations, and/or sulfur dioxide gas, is introduced from a fourth process stream 25 and mixed substantially. The reaction of hydrogen sulfide with sulfites, bisulfites, or sulfur dioxide produces thiosulfate in Injection Mixer 200. It should be easily understandable to persons skilled in the art that any cation producing a soluble sulfite or bisulfite salt can be employed for the reaction with hydrogen sulfide. Thus, a cation is chosen that creates a desired thiosulfate. The cations can include, without limitation, sodium, calcium, potassium, magnesium, ammonium, or mixtures thereof. In one or more embodiments, the cation can exclude ammonium. For example, the cation can include sodium or potassium sulfite or bisulfite as using these cations can create another useful product within the ammonium sulfate solution. This process differs substantially from existing processes where the ammonium sulfate solutions are treated with metal salts. While a metal salt is capable of reducing sulfur and precipitating it out of solution, no additional commercial value is added. Rather, a subsequent step is necessary to remove the buildup of insoluble precipitate before the ammonium sulfate solution can be utilized.

According to an embodiment, sulfite or bisulfite is added in a stoichiometric excess to hydrogen sulfide. The excess anion ensures that any downstream addition of hydrogen sulfide is reacted, and it also substantially reduces the risk for the hydrogen sulfide gas to be liberated. Correspondingly, maintaining an excess of ammonium cation, for instance, in solution enables sulfur dioxide gas to react with water to form sulfite anions in situ. The sulfites can subsequently react with hydrogen sulfide to form ammonium thiosulfate.

The final solution in Injection Mixer 200 optimally contains ammonium thiosulfate (and another desired thiosulfate product, if a different cation is used), without any unreacted hydrogen sulfide. This final solution, and specifically the thiosulfate, maintains the redox balance and excess sulfite is not oxidized to sulfate. Thus, the sulfite persists in solution to react with hydrogen sulfide added later.

From Injection Mixer 200, the ammonium sulfate and ammonium thiosulfate solution progresses as stream 30 to Storage Tank 300. In one or more embodiments, additional ammonia gas can be introduced into stream 30 to maintain a pH at which ammonium thiosulfate does not decompose. It is noted that the entirety of the process is operated at a temperature below 225° F., above which ammonium thiosulfate may begin to degrade.

FIG. 2. encompasses the same process as described in FIG. 1 with the addition of a recycle stream. Recycle Stream 28 assists with buffering the process between Injection Vessel 100 and Process Stream 30. Specifically, the recycle stream 28 enables liberated hydrogen sulfide to be returned for the reaction with additional sulfites and bisulfites. Ammonium bisulfite and ammonium thiosulfate can dissociate at pH levels below 4.5 and there is a higher potential for hydrogen sulfide to remain in the gas phase. Accordingly, the pH of the recycle stream and the Process Stream 20 is kept above 4.50 and is preferably kept in the range of 5.0 to 10.5 and more preferably kept in the range of 5.5 to 8.5. The higher pH values can ensure that entrained hydrogen sulfide is captured more easily and also reduces the possibility of other side reactions. The ammonium bisulfite and ammonium thiosulfate in the circulating solution will rapidly convert the entrained hydrogen sulfide or ammonium sulfide compounds to ammonium thiosulfate.

The one or more embodiments of the invention, therefore, result in the production of ammonium thiosulfate that is substantially free of any entrained hydrogen sulfide, and is safe to use as a fertilizer. Thus, the process advantageously removes the dangerous chemical while also adding commercial value as agricultural fertilizers. Relative to ammonium sulfate, the thiosulfate has an increased sulfur content. The sulfate component of thiosulfate provides immediate bioavailability upon addition to soil and the elemental sulfur is slowly converted to sulfate over time. Therefore, the thiosulfate anion serves as both an immediate and slow-release source of sulfur.

The description presents several preferred embodiments of the present invention in sufficient detail such that those skilled in the art can make and use the invention. As used herein, the words "comprise," "have," "include," and all grammatical variations thereof are each intended to have an open, non-limiting meaning that does not exclude additional elements or steps.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Therefore, the present invention is well adapted to attain the ends and advantages mentioned as well as those that are inherent therein. The one or more embodiments disclosed above are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope and spirit of the present invention.

We claim:

1. A process for selectively eliminating hydrogen sulfide entrained in an aqueous ammonium sulfate solution, comprising:
    injecting a solution containing sulfite and/or bisulfite ions into the aqueous ammonium sulfate solution;
    mixing the two solutions thoroughly to produce an aqueous mixture comprising ammonium sulfate and ammonium thiosulfate,
    wherein the sulfite and/or bisulfite ions are present in the injected solution in a stoichiometric excess to the hydrogen sulfide.

2. The process according to claim 1, further comprising recycling a stream comprising liberated hydrogen sulfide with the aqueous ammonium sulfate solution.

3. The process according to claim 1, wherein the aqueous ammonium sulfate solution has a pH greater than 4.5.

4. The process according to claim 1, wherein the aqueous ammonium sulfate solution has a pH in the range of about 5.5 to about 8.5.

5. The process according to claim 1, wherein the injected solution further comprises one or more cations.

6. The process according to claim 5, wherein the one or more cations is selected from the group consisting of sodium, calcium, potassium, magnesium, ammonium, and mixtures thereof.

7. The process according to claim 5, wherein the one or more cations comprises at least one of sodium sulfite and/or bisulfite and/or potassium sulfite and/or bisulfite.

8. The process according to claim 1, wherein the aqueous ammonium sulfate solution is produced by injecting sulfuric acid into a solution containing ammonia gas, water vapor and hydrogen sulfide.

9. The process according to claim 8, wherein the ammonia gas is obtained from a source selected from the group consisting of an anerobic digester, a refinery processing high ammonia crude, a landfill liquid stream, a wastewater treatment facility and a green ammonia source.

10. The process according to claim 8, further comprising maintaining a ratio of the ammonia to hydrogen sulfide at above 1:1.

11. The process according to claim 8, further comprising maintaining a ratio of the ammonia to hydrogen sulfide at about 2:1.

12. The process according to claim 8, further comprising introducing additional ammonia gas into the mixture of the two solutions to maintain a pH at which ammonium thiosulfate does not decompose.

13. The process according to claim 8, further comprising 2%-4% excess sulfuric acid.

* * * * *